United States Patent
Gillespie (10) Patent No.: US 8,555,020 B2
(45) Date of Patent: Oct. 8, 2013

(54) RECLAIMING SPACE OCCUPIED BY AN EXPIRED VARIABLE RECORD IN A NON-VOLATILE RECORD STORAGE

(75) Inventor: Kurt David Gillespie, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 13/243,087

(22) Filed: Sep. 23, 2011

(65) Prior Publication Data

US 2013/0080682 A1 Mar. 28, 2013

(51) Int. Cl.
*G06F 12/02* (2006.01)
(52) U.S. Cl.
USPC .......... 711/165; 711/103; 711/E12.009; 711/E12.011
(58) Field of Classification Search
USPC .......... 711/103, 165, E12.009, E12.011
See application file for complete search history.

(56) References Cited

U.S. PATENT DOCUMENTS

| 5,797,023 | A | 8/1998 | Berman et al. | |
|---|---|---|---|---|
| 6,009,520 | A | 12/1999 | Gharda | |
| 7,185,189 | B2 | 2/2007 | Stevens | |
| 8,429,352 | B2 * | 4/2013 | Sinclair | 711/135 |
| 2004/0044837 | A1 * | 3/2004 | Hasbun et al. | 711/103 |
| 2004/0268116 | A1 | 12/2004 | Vasisht et al. | |
| 2005/0273584 | A1 | 12/2005 | Wisecup et al. | |
| 2010/0131702 | A1 * | 5/2010 | Wong et al. | 711/103 |

* cited by examiner

*Primary Examiner* — Hal Schnee (57) ABSTRACT

In a method for reclaiming space occupied by an expired variable record in a non-volatile record storage, a reclaim state data that includes a state of a reclaim operation is maintained. In addition, the state of the reclaim operation is marked to indicate a progress of the reclaim operation at a plurality of stages of the reclaim operation. The reclaim operation is implemented by sliding, one section at a time, the data in a first direction along the plurality of sections and by sliding, one section at a time, the variable records, excluding the expired variable record, in a second direction along the plurality of sections, to thereby remove the expired variable record.

15 Claims, 10 Drawing Sheets

```
                           BIT
                          ┌─ 402
typedef struct {

SlideRightStarted : 1              // Indicates Section has started
                                          the right copy
    SlideRightFinished : 1             // Indicates Section has finished
                                          the right copy
    SlideLeftStarted : 1               // Indicates Section has started
                                          the left copy
    UncopiedBytesFromNextSection : 10  // Indicates the uncopied bytes of
                                          the current chunk that reside
                                          in the following section
    UncopiedBytesIncludes2ndHeaderByte : 1   // Indicates if the 2nd byte of the
                                          master header for this chunk
                                          resides in the next section
    SlideLeftFinished : 1              // Indicates Section has finished
                                          the left copy
    Reserved : 1                       // Reserved bit } HP_NVS_ReclaimSectionState;          // 2 Bytes Size
```

RECLAIMING SPACE OCCUPIED BY AN EXPIRED VARIABLE RECORD IN A NON-VOLATILE RECORD STORAGE

BACKGROUND

The Basic Input and Output System (BIOS) firmware and the more recent Unified Extensible Firmware Interface (UEFI) firmware are typically stored on a Read-Only Memory (ROM) device. The ROM device is typically rewritable to allow modifications to the data contained in the firmware. For instance, the ROM device may be an Electrically Erasable Programmable ROM (EEPROM), a hard disk drive, a flash memory device, or a combination of different types of devices. The BIOS/UEFI firmware typically controls the start-up process of a computer system, which includes identifying, testing, and initializing devices of a computing apparatus. After initialization, the firmware typically starts an operating system of a computing apparatus and may pass all or part of the functions, and/or responsibilities, to the operating system. BIOS or UEFI firmware implementations often utilize the same storage device for storing platform or system defined variable records to ensure they are non-volatile. To provide system reliability, often the implementation of a non-volatile variable storage is designed to be fault-tolerant, which protects the records in the storage system during power loss or interruptions.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

During the useful lifetime of a computing apparatus, variable records that the computing apparatus may implement for various start-up processes are written into a reserved array or set of sections of a BIOS/UEFI Read-Only Memory (ROM). More particularly, when new/changed records are added, the variable records are added to the end of a stream of variable records already stored in sections of the BIOS/UEFI ROM. As the additional variable records are inserted at the end of the stream, some of the variable records become expired, invalid, or inactive, for instance, as the data becomes outdated and is replaced with newer records at the end of the stream. Alternatively, the records are explicitly requested to be erased by the firmware. The expired variable records, however, cannot merely be immediately erased from the storage device because they form part of a long string of bytes that is called in the order in which they are arranged.

Disclosed herein are a method, computing apparatus, and computer readable storage medium for reclaiming the space occupied by an expired variable record in the BIOS/UEFI ROM in a fault-tolerant and a space-minimizing manner. The reclaim operation disclosed herein is also performed while maintaining the ability to read variable records out to appropriate firmware requests before utilization of RAM is available to the system. More particularly, the reclaim operation disclosed herein maintains a complete copy of each of the variable records at each stage of the reclaim operation, regardless of the current stage of the reclaim being executed, or whether the variable record traversed multiple sections. In addition, the reclaim operation disclosed herein maintains a record of the reclaim operation progress to enable a determination of which range of bytes are no longer storing useful information, and therefore presents regions that are valid to thus enable access to the appropriate variable records following an interruption to a reclaim operation. Moreover, the reclaim operation disclosed herein is to merely employ a single free section in the BIOS/UEFI ROM regardless of the actual number of sections provided by the firmware layout. In this regard, the method, computing apparatus, and computer readable storage medium disclosed herein are fault-tolerant, able to run without RAM, and to employ a minimal amount of space.

According to an example, the reclaim operation disclosed herein may be triggered, for instance, when there is less space available in the non-volatile record storage than is needed for the addition of a new non-volatile variable record. Further disclosed herein is a method for substantially minimizing the sizes of the variable records, thereby minimizing the number of times a reclaim operation is to be executed on the BIOS/UEFI ROM during its lifetime, which may increase the BIOS/UEFI ROM lifetime and platform reliability.

Figure 1:
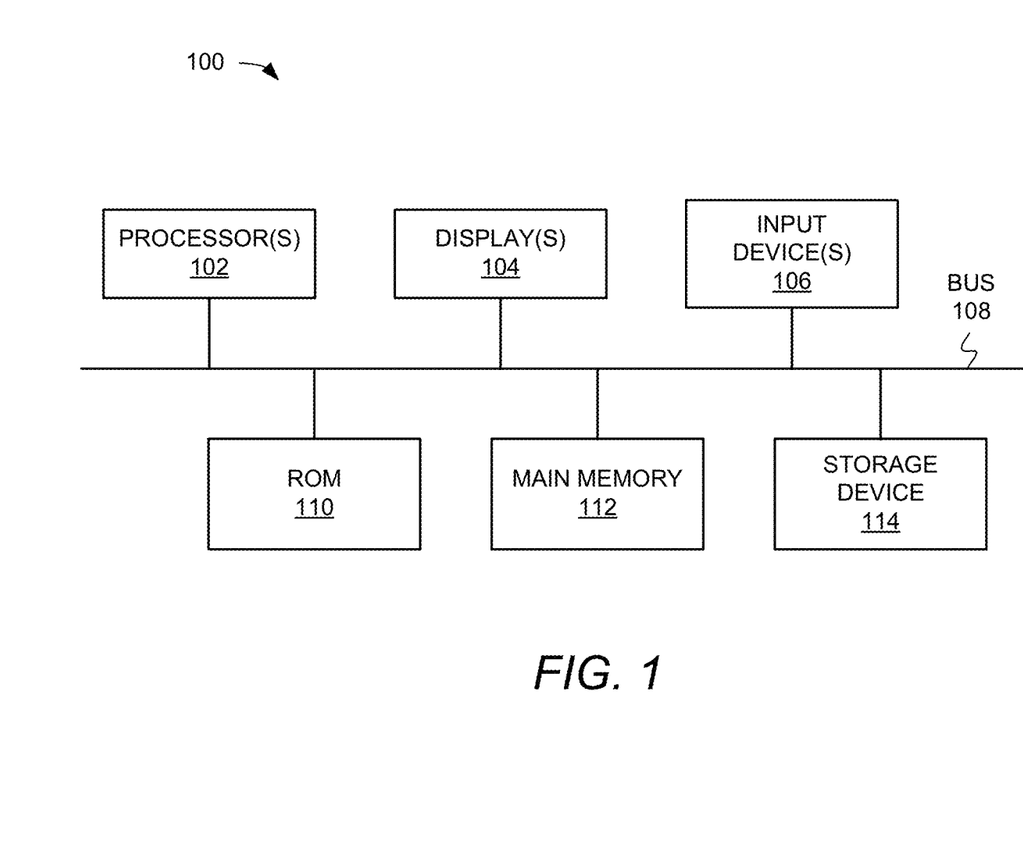
FIG. 1 shows a schematic representation of a computing apparatus, configured in accordance with an example of the present disclosure.

With reference first to FIG. 1, there is shown a schematic representation of a computing apparatus 100, configured in accordance with an example of the present disclosure. It should be understood that the computing apparatus 100 may include additional components and that some of the components described herein may be removed and/or modified without departing from a scope of the computing apparatus 100.

The computing apparatus 100 includes a processor(s) 102, a display(s) 104, at least one input device 106, a bus 108, a Read Only Memory (ROM) 110, a main memory 112 (which may be a Random Access Memory (RAM)), and a storage device 114 (which may be a floppy disk, a compact disk, or other removable or fixed storage device). The display 104, input device(s) 106, ROM 110, main memory 112, and storage device 114 are depicted as being in communication with the processor(s) 102 through the bus 108.

Generally speaking, the main memory 112 stores data and instructions to be executed by the processor(s) 102 and may also store temperature files or other data during execution of the instructions by the processor(s) 102. The ROM 110 and the storage device 114 may also store data and instructions to be executed by the processor(s) 102. In addition, the ROM 110 may store the BIOS and/or UEFI and may comprise, for instance, a flash ROM or other types of reprogrammable non-volatile storage. As discussed in greater detail herein below, the BIOS/UEFI ROM 110 is formed of a plurality of sections of the same size, such as flash sections, that are to store variable records. The variable records may comprise data and/or instructions that may be implemented prior to, during, and/or following bootup of the computing apparatus 100 or for other operations performed in the computing apparatus 100. As another example, the variable records may comprise any type of data and/or instructions that may be stored onto a data storage drive. Stored variable records are commonly used to store settings used during the boot phase of a platform, but may also be utilized by other BIOS/UEFI firmware, firmware loaded from other attached hardware, or the operating system to store any data they deem necessary.

According to an example, the variable records may comprise any byte(s) that a component in the UEFI BIOS or in a UEFI OS is to store using a globally unique identifier (GUID)/Name pair. An example of the variable records comprises specific bit settings for a chipset during initialization. The specific bit settings may include, for instance, that this machine has been set up with an indication that it has a small form factor and with an indication as to whether a certain fan type bit in the chipset should be set or not. Another example of the variable records comprises settings from the BIOS Setup that choose whether certain features are enabled/disabled. A further example of the variable records comprises settings from the BIOS Setup that indicates how those features are setup, such as, a feature indicating whether serial ports are powered, and if so, whether the power level is 3 v, 5 v, or 12 v. A further example of the variable records comprises passwords, which are in encrypted form before being passed to the storage, for features/access to the machine. A still further example of the variable records comprises OS file hash lists of whether a certain file should be allowed to be booted to.

As also discussed in greater detail herein below, the computing apparatus 100 is to implement a reclaim operation to reclaim space occupied by expired variable record(s) in the BIOS/UEFI ROM 110. The reclaim operation generally enables the variable records to be readable during the reclaim operation and to be readable by code prior to utilization of RAM being available. In addition, the reclaim operation is fault tolerant, in that, the reclaim operation may be continued from a point at which the computing apparatus 100 or the reclaim operation has failed. Moreover, the reclaim operation does not require a relatively large amount of space in the BIOS/UEFI ROM 110. Various manners in which the reclaim operation may be implemented are discussed with respect to the method 200 depicted in FIG. 2.

Figure 2:
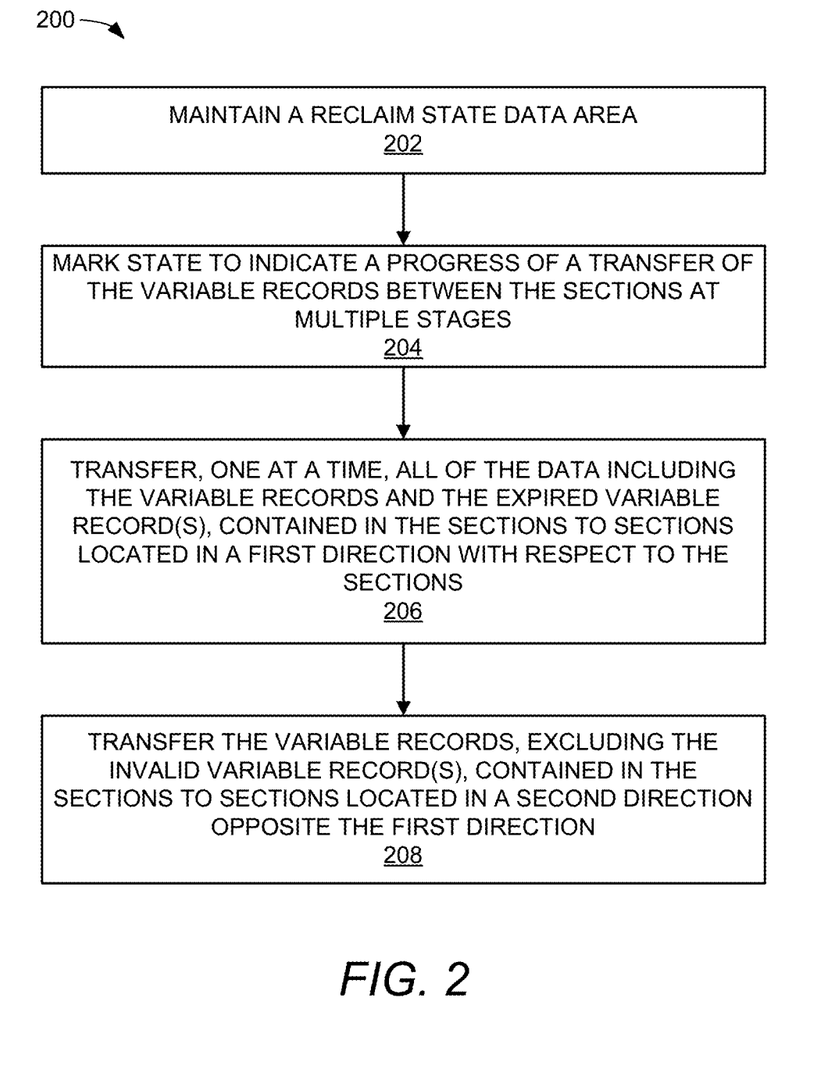
FIG. 2 depicts a flow diagram of a method for reclaiming space occupied by an expired variable record in a non-volatile storage formed of a plurality of sections, according to an example of the present disclosure.

More particularly, FIG. 2 shows a flow diagram of a method 200 for reclaiming space occupied by an expired variable record in a non-volatile storage formed of a plurality of sections, according to an example. The plurality of sections includes data, which comprises at least one of variable records and an expired variable record. It should be readily apparent that the method 200 represents a generalized illustration and that other elements may be added or existing elements may be removed, modified or rearranged without departing from the scope of the method 200.

According to an example, the computing apparatus 100 comprises a module (not shown) containing a set of instructions to implement the method 200. The module may be stored in any of the ROM 110, the main memory 112, and the storage device 114. In addition, the processor(s) 102 may execute the module. In this regard, the method 200 may be stored as machine readable instructions on a non-transitory computer readable medium, such as, on any of the ROM 110, the main memory 112, and the storage device 114.

As shown in the method 200, at block 202, a reclaim state data area is maintained in a section of the plurality of sections in the non-volatile storage record. The reclaim state data area may store various information pertaining to a state of a reclaim operation being performed on the sections to reclaim space occupied by an expired variable record. According to an example, the reclaim state data area is maintained in a reserved empty section positioned at a distal end of the plurality of sections along a first direction. In other words, the reclaim state data area and/or the reserved empty section may be positioned at the section that is read last by the BIOS/UEFI during a reading operation.

At block 204, the state of the reclaim operation is marked to indicate a progress of the reclaim operation at a plurality of stages of the reclaim process. The state of the reclaim operation may be marked, for instance, when the reclaim operation is initiated, following transfer of data from section to another, following erasure of data from a section, etc. In one regard, the marked state of the reclaim operation may be used to determine at any time during the reclaim operation, the stage of the reclaim operation. As such, following a failure of the computing apparatus 100, for instance, the reclaim operation may be continued from the appropriate stage. The reclaim operation is therefore fault-tolerant.

At blocks 206 and 208, the reclaim operation is implemented. At block 206, data recorded in the plurality of sections are slid along the plurality of sections, one section at a time, in a first direction. The first direction may comprise the direction in which the data, which includes at least one of the variable records and an expired variable record, are read from the plurality of sections. More particularly, at block 206, the data recorded in the plurality of sections, including both variable records and expired variable records, are transferred from the sections in which the data is recorded to sections located in the first direction, one section at a time. That is, for instance, the data contained in the section positioned the furthest along the first direction is transferred to an adjacent section in the first direction. Following that transfer, the data contained in the section next to the section positioned the furthest along the first direction is transferred, and so forth. The transfer of the data comprises copying the data from one section to another and erasing the data from the section from which the data was copied. At each stage of the transfer, the state of the reclaim operation is marked to identify the particular stage of the reclaim operation, as indicated at block 204.

At block 208, the variable records that have been slid in the first direction at block 206 are slid in a second direction along the plurality of sections. The second direction comprises an opposite direction from the first direction. The expired variable record(s), however, are excluded from the sliding operation at block 208 to thereby remove the expired variable record(s). More particularly, at block 208, the variable records, excluding the expired variable record, are transferred, one section at a time, from the plurality of the sections to which the variable records were transferred at block 206 to a plurality of the sections located in the second direction. The transfer of the variable records comprises copying the variable records from one section to another and erasing both the variable records and the expired variable record(s) from the section from which the variable records were copied. At each stage of the transfer, the state of the reclaim operation is marked to identify the particular stage of the reclaim operation, as indicated at block 204.

A more detailed discussion of the method 200 is described herein with respect to the diagrams depicted in FIGS. 3A-3F, which respectively show different stages of a reclaim operation performed on a non-volatile record storage 300. The non-volatile record storage 300 may comprise, for instance, the BIOS/UEFI ROM 110 or the portion of the non-volatile record storage 300 to which the BIOS/UEFI is to use to store variable records. As shown in FIGS. 3A-3F, the non-volatile record storage 300 includes a plurality of sections 302a-302j, which may comprise flash memory sections. The sections 302a-302j may be arranged in sequential order and may have the same size. Although the non-volatile record storage 300 has been depicted as including a particular number of sections 302a-302j, it should be clearly understood that the non-volatile record storage 300 may include any number of sections, as long as at least two sections are provided, without departing from a scope of the method 200. In addition, each of the sections 302a-302j may comprise any suitable consistent size as may be defined by the hardware restrictions of BIOS/UEFI ROM 110, such as, for instance, 4 KB, 64 KB, etc.

Figure 3A:
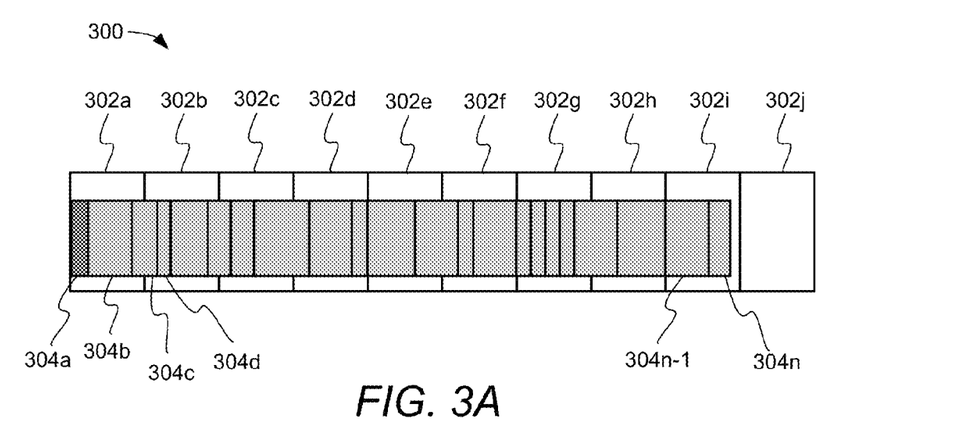
FIGS. 3A-3F, respectively, depict various stages of a reclaim operation with exactly one expired record, according to an example of the present disclosure.

Also shown in FIG. 3A are a plurality of variable records 304a-304n, in which "n" is an integer value equal to or greater than 1, stored in the sections 302a-302i. The variable records 304a-304n are stored in the sections 302a-302j starting from the first section 302a and moving toward the last section 302j. In addition, the variable records 304a-304n are depicted as either being contained within a particular section 302a-302i or spanning across multiple ones of the sections 302a-302i. For instance, the variable record 304c is depicted as spanning across sections 302a and 302b.

The last section 302j in the non-volatile storage 300, as shown in FIG. 3A, is depicted as being empty. That is, the last section 302j is depicted as not having a variable record stored thereon. According to an example, the last section 302j is kept empty and reserved throughout the operational lifetime of the BIOS/UEFI ROM 110 to enable data from the second to last section 302i to be written to the last section 302j when the reclaim operation discussed below is implemented. As the last section, 302j in FIG. 3A, is the only section that is to be reserved for the reclaim operation discussed herein, the reclaim operation does not require a great deal of extra space to be implemented.

The first variable record 304a in FIG. 3A has been shaded differently from the other variable records 304b-304n to denote that the first variable record 304a is expired, whereas the remaining variables are not. That is, for instance, the first variable record 304a comprises data for which newer data has been stored in a later variable record 304b-304n. In another example, the first variable record 304a comprises data that is no longer needed and has been requested to be deleted from storage. As discussed above, instead of being deleted automatically when the newer data was stored, the first variable record 304a has been indicated as being expired, such that, the data contained therein is passed over as the variable records 304b-304n are traversed and/or accessed while searching for a certain active variable record. In addition, it should be clearly understood that the method 200 may be implemented to reclaim space occupied by any of the variable records 304a-304n, regardless of their positions in the sections 302a-302j.

Figure 3B:
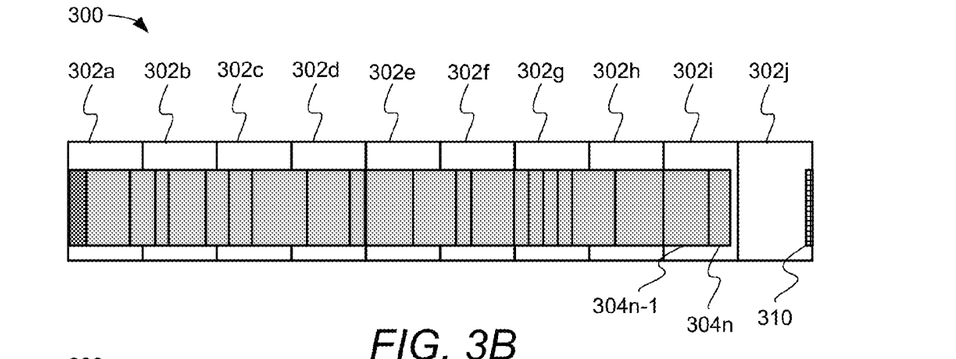

As shown in FIG. 3B, a reclaim state data area 310 is generated, for instance, in a section 302j of the non-volatile storage 300. Although the state data area 310 has been depicted as being generated in a particular section 302j of the non-volatile storage 300, it should be understood that the state data area 310 may be generated in a different section 302a-302i or externally to the non-volatile storage 300 without departing from a scope of the method 200. According to a particular example, an extra space, such as, about 2 bytes per section being managed, in the last section 302j is reserved for the generation of the reclaim state data area 310. In this regard, a reserved space of the same size of the reclaim state data area 310 in 302j in the second to last section 302i may be kept reserved or empty. As such, variable records are unable to be written into the reserved space, which ensures that when data from 302i is slid into 302j, the state table is not overwritten.

Figure 3C:
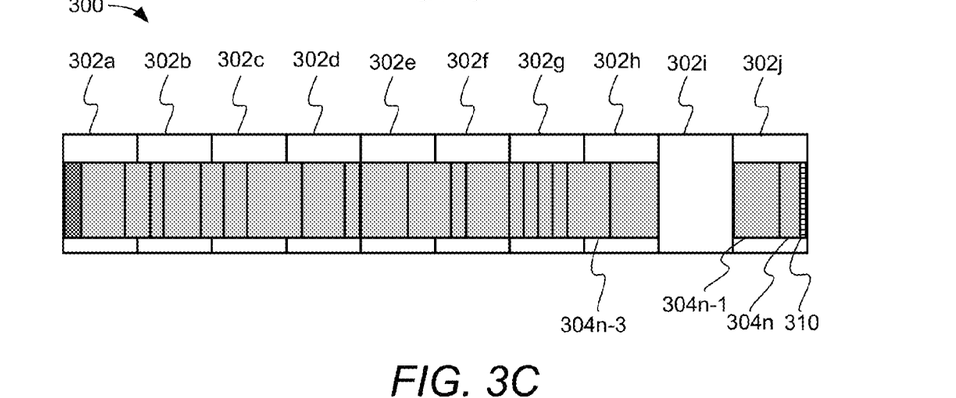

The reclaim state data area 310 may store various information pertaining to the state of a reclaim operation being performed on the sections 302a-302j to reclaim space occupied by the expired variable record 304a. More particularly, for instance, the reclaim state data area 310 may include information that indicates a progress of the reclaim operation at a plurality of stages of the reclaim operation. The state of the reclaim operation may include, for instance, whether a slide operation in the first direction has been started and whether the slide operation in the first direction has been successfully verified and finished. The state of the reclaim operation may also include, for instance, whether a slide operation in the second direction has been started and whether there are uncopied bytes from a current variable record that resides as a temporarily split variable record between two non-adjacent sections. The state of the reclaim operation may further include, for instance, whether part of a master header used for locating and traversing through the variable records is split between two non-adjacent sections. The state of the reclaim operation may still further include, for instance, whether the slide operation in the second direction has been successfully verified and finished. The state of the reclaim operation may further include additional states. An example of one element 400 of a reclaim state table comprising the information pertaining to the state of a reclaim operation being performed for a particular section is depicted in FIG. 4. As such, in the examples depicted in FIGS. 3A-3F, which has been depicted as having 10 sections 302a-302j, the reclaim state table may have 10 elements similar to the element 400 shown in FIG. 4.

As shown in the element 400 of the reclaim state table, various bits 402 are set to indicate the progress of the reclaim operation for the particular section. Definitions of the different types of information tracked in the elements 400 of the state table are also depicted in FIG. 4. The parts of the reclaim state table also show a method of organization that does not require that a traditional section be erased when changing data in the reclaim state table but may employ bit writes, thereby allowing updating of the reclaim state table throughout the process without erasing the area used by the table.

According to an example, the information contained in the elements 400 of the reclaim state table may be accessed during every boot. In one regard, the information may be accessed to determine if a power failure of the computing apparatus 100 occurred during the reclaim operation. In addition, the information may be accessed to determine, for instance, which range of bytes in sections 302a-302j are valid for traversing to find complete variable records during an interrupted reclaim operation. Also, the information may be implemented to continue the reclaim operation following the power failure regardless of the number of steps that were finished. In this regard, the machine is allowed to eventually reach a post-reclaim operation safe state following a power failure. Moreover, the reclaim operation disclosed herein is fault-tolerant. With respect to FIGS. 3D and 3E, if a power failure occurred during these operations, the reclaim state table would contain information that may be used to determine that for FIG. 3D, the range of bytes that are valid for traversing is between the first byte of section 302b until the end of all of the sections 302a-302j. The reclaim state table would also contain information that may be used to determine that for FIG. 3E, the range of bytes that are valid for transferring is from the first byte of variable record 304b to the last byte of the partial variable record 306a. The reclaim state table would further contain information that may be used to determine that for FIG. 3E, a second range of bytes that are valid for transferring is from the first byte of the partial variable record 306b to the last byte of the last variable record 304n. When forced to do a reading from an interrupted reclaim variable storage, but the reclaim operation has been finished, the two ranges in FIG. 3E are treated as if they were connected, ignoring any invalid range of bytes that resides between them.

According to an example, the state of the reclaim operation may be marked prior to the transfer of all of the data from a section 302i to a section 302j. The state of the reclaim operation may also be marked following the verified transfer of all of the data recorded in section 302i to the section 302j. The state of the reclaim operation may further be marked prior to the transfer of the non-expired variable records in section 302j to the section 302i. The state of the reclaim operation may still further be marked following the verified transfer of the non-expired variable records in section 302j to the section 302i. At a first stage, for instance, the bit for the "SlideRightStarted" entry for the second to last section 302i in the element 400 of the reclaim state table may be cleared to "0" from its natural erase state of "1". This change may indicate that the section 302i has started the transfer process of moving data to 302j.

In addition, the variable records 304a-304n, including the expired record 304a, contained in the sections 302a-302i are transferred to sections 302b-302j located in a first direction with respect to the sections 302a-302i. The data, which comprises at least one of variable records and an expired variable record, recorded in the sections 302a-302i are transferred one section at a time. In addition, each section is transferred completely before attempting the transfer of the data recorded in the next section. More particularly, and as shown in FIG. 3C, the variable records 304n and 304n-1 stored in the second to last section 302i are transferred to the last section 302j because they were present inside 302i when the entire contents of the second to last section 302i were transferred.

In addition, following each respective transfer of the variable records 304a-304n in the sections 302a-302i, the state of the reclaim operation may be marked to indicate that the transfer of the variable record(s) 304a-304n in that section 302a-302i has been transferred. More particularly, for instance, the "SlideRightFinished" entry for the section 302a-302i in the state table 400 may be set to "0" following the transfer of the variable record(s) 304a-304n in each of the respective sections 302a-302i.

The transfer of the variable records 304a-304n comprises sequentially copying the variable records 304a-304n contained in the respective sections 302a-302j and erasing sections in a reverse order. That is, the variable records 304n-1 and 304n contained in the second to last section 302i are copied into the last section 302j, the state is marked to indicate that all data in section 302i have been copied, and the data in the second to last section 302i is erased. This process is repeated for each of the remaining variable sections in order. In addition, for those variable records, for instance, variable record 304n-3, that traverse multiple sections 302g and 302h before the reclaim operation starts, the portions of the variable records contained in one section 302h may be copied and erased separately from the portions of the variable records contained in another section 302g. Thus, the portion of the variable record 304n-3 that is contained within the section 302h may be transferred prior to the portion of the variable record 304n-3 that is contained within the section 302g. In addition, the state of the reclaim operation may contain an indication that there are portions of the variable records that have not been copied, for instance, as identified by the "UncopiedBytesFromNextSection" in the reclaim state table 400.

Figure 3D:
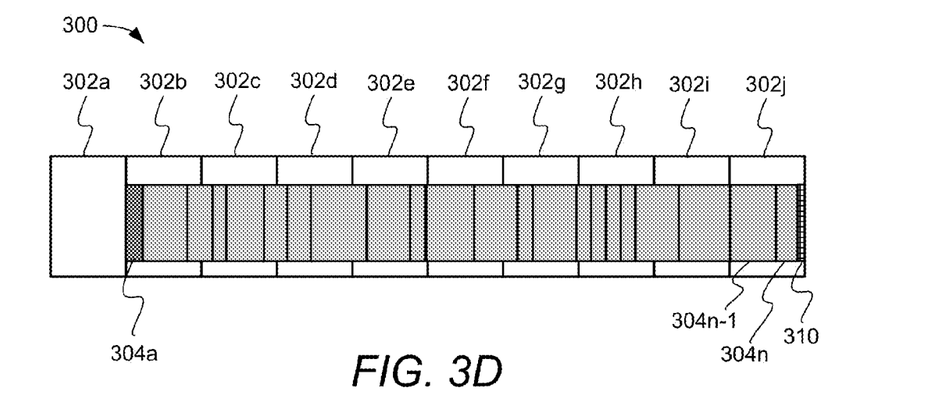
Figure 3E:
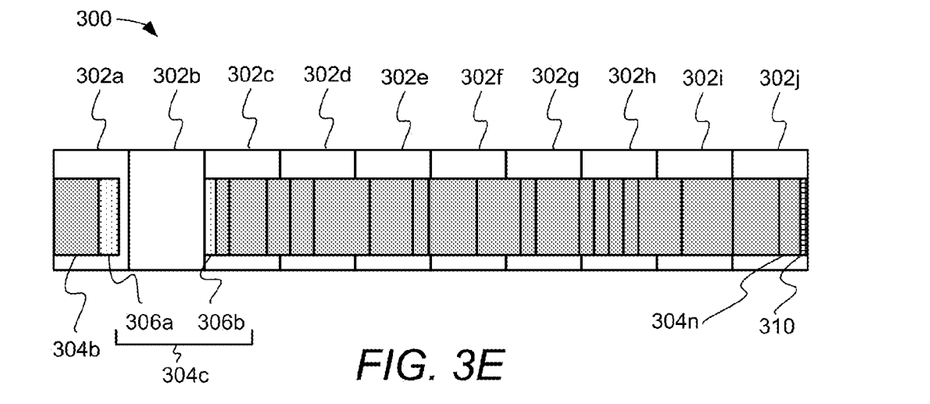
Figure 4:
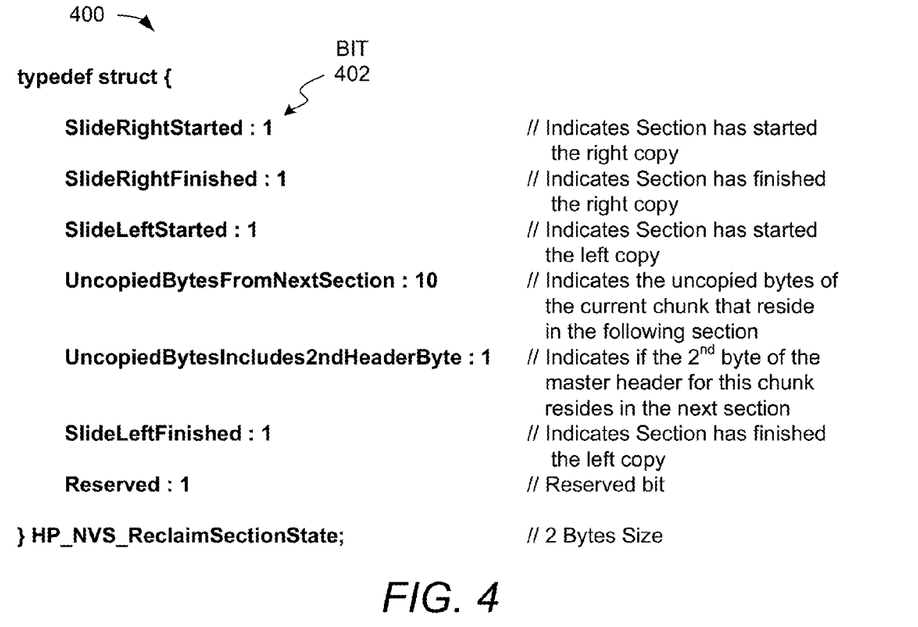
FIG. 4 depicts an element of a reclaim state table comprising information pertaining to the state of a reclaim operation for a particular section, according to an example of the present disclosure.

An example of the state of the data recorded in the sections 302a-302j of the non-volatile storage 300 following the sliding or transfer of the data from the sections 302a-302i to 302b-302j is depicted in FIG. 3D. As shown therein, the expired variable record 304a has also been transferred from the first section 302a to the second section 302b, leaving the first section 302a empty. FIG. 3D also shows that for this example, every single byte available to be used prior to a reclaim operation being triggered had been used. In addition, in instances where a plurality of the variable records are expired, each of the expired variable records may be transferred during the sliding operation in the first direction.

FIG. 3E shows that the variable records 304b-304n, excluding the expired variable record 304a, are transferred from the sections 302b-302j to build a new variable record stream starting at the front of 302a. As such, the expired variable record 304a is removed by copying only non-expired variable records back into the stream. More particularly, when transferring the contents of section 302b in FIG. 3D that are non-expired, the variable record 304b and a portion 306a of the variable data 304c stored in the section 302b in FIG. 3D are transferred to the start of the variable records stream starting in section 302a in FIG. 3E. FIG. 3E shows the state of the reclaim operation after a start and completion of transferring one section from the state shown in FIG. 3D. In addition, each section 302c-302j is individually transferred in the same manner to move the non-expired variable records from each section back into the stream being built.

Prior to each respective transfer of the variable records 304a-304n from the sections 302b-302j to the sections 302a-302i, the multiple different states may be marked to indicate that the transfer of the variable record(s) 304a-304n in that section 302b-302j is to start or that it has finished. More particularly, for instance, the "SlideLeftStarted" entry for the section 302a-302i in the state table 400 may be set to "0" prior to the transfer of the variable record(s) 304a-304n into each of the respective sections 302a-302i. In addition, following each respective transfer of the variable records 304a-304n from the sections 302b-302j to the sections 302a-302i, the state of the reclaim operation may be marked to indicate that the transfer of the variable record(s) 304a-304n in that section 302b-302j has been finished. More particularly, for instance, the "SlideLeftFinished" entry for the section 302a-302i in the state table 400 may be set to "0" following the transfer of the variable record(s) 304a-304n into each of the respective sections 302a-302i. Other fields of the state table 400, such as "UncopiedBytesFromNextSection" or "UncopiedBytesIncludes2ndHeaderByte", may also be assigned values before or after a separate state is marked.

The transfer of the variable records 304a-304n comprises sequentially copying the variable records 304a-304n contained in the respective sections 302b-302j and erasing each section once the non-expired data has been properly transferred. That is, initially, the variable record 304b and a portion 306a of the variable data 304c contained in the second section 302b are copied into the first section 302a. In addition, the state is marked to indicate that the variable record 304b and the portion 306a of the variable record 304c have been copied to the first section 302a. Moreover, the copied variable record 304b and the portion 306a are marked as valid and the copies of the variable record 304b and the portion 306a of the variable record 304c are erased when the entire 302b section is erased in preparation for the next section's transfer. This process is repeated for each of the remaining variable records 304d-304n, including a portion 306b of the variable record 304c. In this regard, the expired variable record 304a may be erased during the erasing operation since the expired variable record 304a was not copied. In addition, in instances where a plurality of the variable records are expired, each of the expired variable records may be erased.

In addition, following the transfer of the first portion 306a of the variable record 304c to the first section 302a, the state of the transfer of that portion 306a of the variable record 304c may be marked to denote how much of the variable record 304c remains to be transferred. For instance, the "UncopiedBytesFromNextSection" entry for the section 302b in the reclaim state table 400 may be set to a value indicative of the remaining bytes to be transferred. Moreover, the remaining portion 306b of the variable record 304c may be transferred to the section 302b during transfer of the variable records contained in the third section 302c.

Figure 3F:
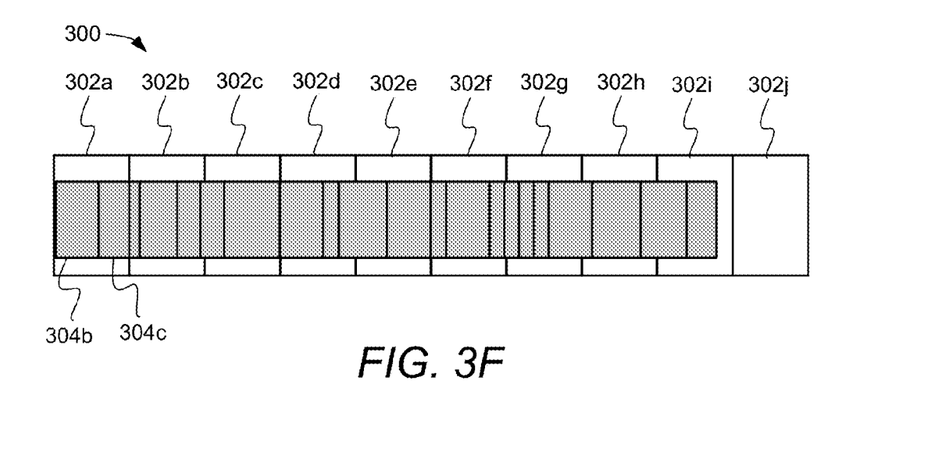

The remaining variable records 304d-304n may be transferred to the sections 302b-302i in similar manners to fill space(s) left behind by the excluded expired variable record(s) 304a. An example of the non-volatile storage 300 in which the variable records 304a-304n have been transferred to the sections 302a-302i in the second direction and into the sections 302a-302i is depicted in FIG. 3F. As shown therein, following the transfer of the variable records 304b-304n, the last section 302j is again empty with either a reset reclaim state table 310 or no reclaim state table 310, both indicating that when the machine resets, the machine will detect that the variable storage did not have an interrupted reclaim.

Figure 5:
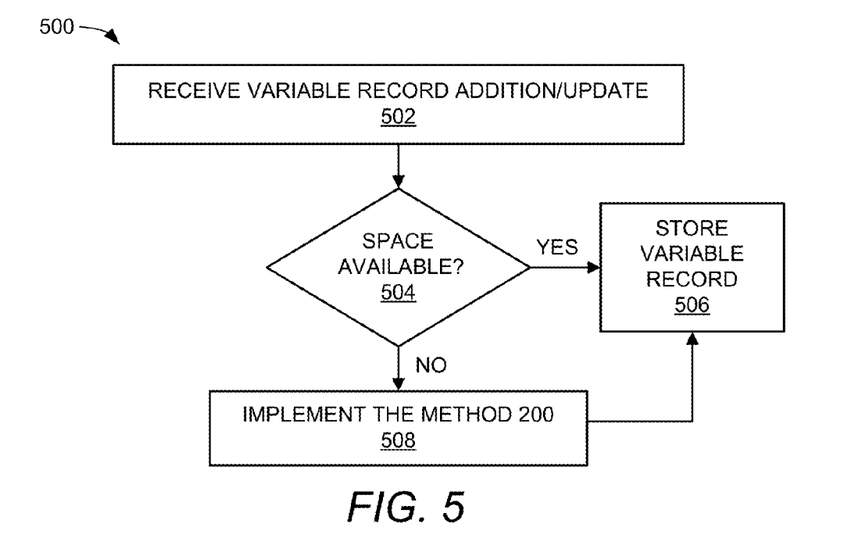
FIG. 5 depicts a flow diagram of a method for triggering implementation of the method 200, according to an example of the present disclosure.

Turning now to FIG. 5, there is shown a flow diagram of a method 500 for triggering implementation of the method 200, according to an example of the present disclosure. It should be readily apparent that the method 500 represents a generalized illustration and that other elements may be added or existing elements may be removed, modified or rearranged without departing from the scope of the method 500. In addition, it should be understood that FIG. 5 may also not be the only method in which the method 200 may be triggered. Instead, for instance, the method 200 may be triggered by preemptively calling the method 200. By way of example, the method 200 may be triggered when a determination is made that it is advantageous to trigger the method 200 before transferring to the operating system in order to minimize any performance impact that the method 200 may have following the transfer.

At block 502, a variable record addition/update to be stored on the non-volatile record storage 300 is received. At block 504, a determination as to whether the non-volatile record storage 300 has sufficient space available for the variable record addition/update to be made. In response to a determination that the non-volatile record storage 300 has sufficient available space, the variable record is stored on the non-volatile record storage 300. However, in response to a determination that the non-volatile record storage 300 has sufficient space available for the variable record addition/update, the method 200 is implemented as indicated at block 508. In addition, following block 508, the variable record may be stored on the non-volatile record storage 300 at block 506.

Figure 6:
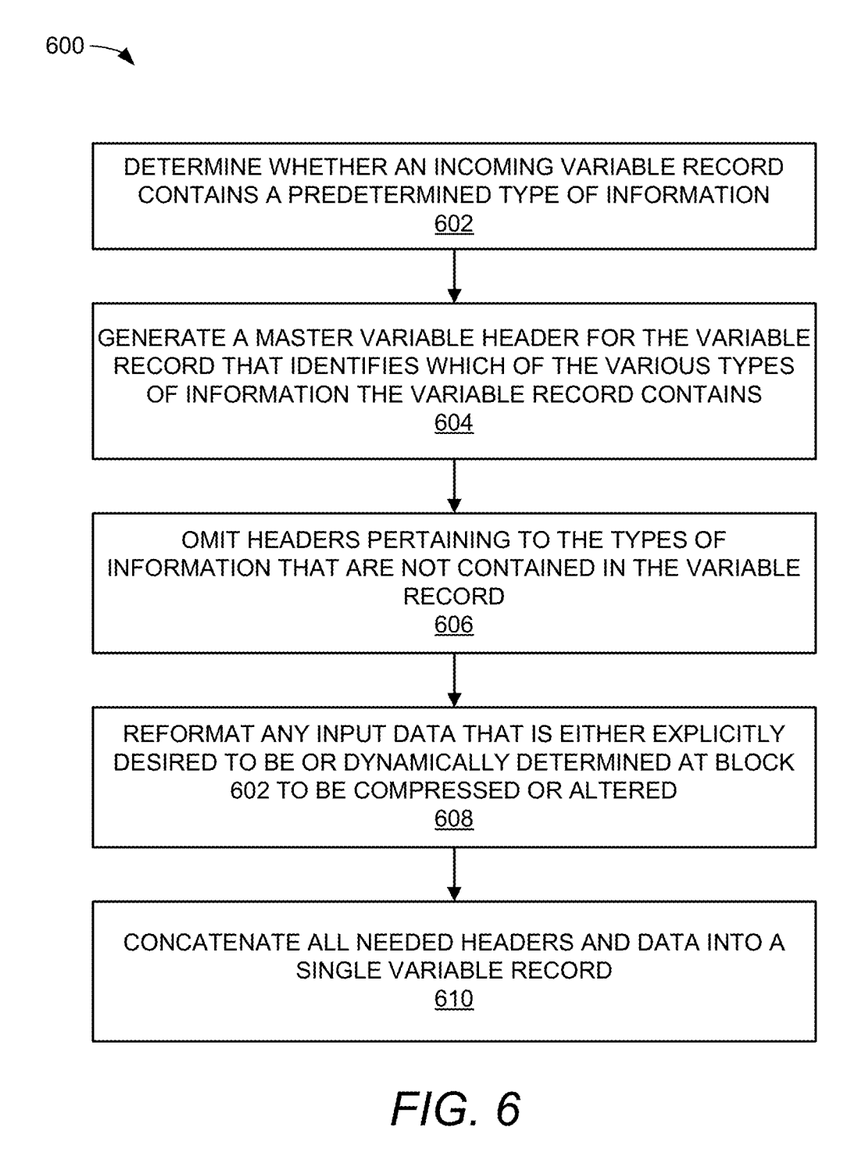
FIG. 6 shows a flow diagram of a method for substantially minimizing sizes of the variable records during creation depicted in block 506 in FIG. 5, according to an example of the present disclosure.

Turning now to FIG. 6, there is shown a flow diagram of a method 600 for substantially minimizing sizes of variable records 304a-304n, according to an example of the present disclosure. It should be readily apparent that the method 600 represents a generalized illustration and that other elements may be added or existing elements may be removed, modified or rearranged without departing from the scope of the method 600. In one regard, the method 600 may be implemented prior to implementation of the method 200 to thereby substantially minimize the amount of space occupied by the variable records 304a-304n in the non-volatile memory 300.

At block 602, a determination as to whether an incoming variable record contains a predetermined type of information is made. The predetermined type of information may include whether further compression operations are to be performed with the knowledge that pre-RAM initialization calls will not need to access this variable. The predetermined type of information may also include whether a write had fully completed or whether to treat the data as incomplete and to be cleaned up at the next boot. The predetermined type of information may further include whether the variable data is still valid. The predetermined type of information may still further include whether the variable data has been compressed using a proprietary compression process. The predetermined type of information may still further include whether the VarName, which may have all upper 8-bits as zero in a Unicode string (for instance, ASCII equivalent characters), has been removed. The predetermined typed of information may still further include whether a variable data has been split up and stored in chunks, a size of the variable data, etc.

At block 604, a master variable header for the variable record that identifies which of the certain types of information the variable record contains is generated. Thus, for instance, the master variable header may include a listing of the types of information and may also include at least one bit that identifies whether the various types of information are contained in the respective variable record. In addition, the master variable header for each variable record may be generated to include a listing of each of the optional headers pertaining to the various types of information.

At block 606, the headers pertaining to the types of information that are not contained in the variable record are omitted from the variable record. In this regard, the variable record includes only those headers for which relevant information is contained in each individual variable record. As such, the space required by the variable records 304a-304n may substantially be minimized.

At block 608, any input data that has either been explicitly desired to be or dynamically determined at block 602 to be compressed or altered is reformatted. In addition, at block 610, all of the needed headers and the data range passed in by the caller, whether altered or not, are concatenated into a single variable record in preparation for writing to the storage stream.

Turning now to FIGS. 7A-7L, there are respectively shown diagrams that depict different stages of a reclaim operation performed on a non-volatile record storage 700, for instance, the BIOS/UEFI ROM 110, or the portion of the non-volatile record storage 700 to which the BIOS/UEFI is to use to store variable records. The non-volatile record storage 700 includes a plurality of sections 702a-702m, which may comprise flash memory sections. The plurality of sections 702a-702m may also be arranged in a sequential order and may have the same size with respect to each other. Although the non-volatile record storage 700 has been depicted as including a particular number of sections 702a-702m, it should be clearly understood that the non-volatile record storage 700 may include any number of sections, as long as at least two sections are provided, without departing from a scope of the reclaim operations disclosed herein. In addition, each of the sections 702a-702m may comprise any suitable consistent size as may be defined by the hardware requirements of BIOS/UEFI ROM 110, such as, for instance, 4 KB, 64 KB, etc.

Generally speaking, the diagrams presented in FIGS. 7A-7L depict various stages of a reclaim operation, such as the reclaim operation depicted in the method 200 (FIG. 2), that may be implemented when a non-volatile record storage 700 contains multiple, interspersed expired variable records throughout the variable records 704a-704n, in which "n" is an integer value equal to or greater than 1. FIGS. 7A-7L, therefore, depict diagrams illustrating a relatively more complex reclaim operations than the reclaim operations depicted in the diagrams of FIGS. 3A-3F, and thus depict similar features to FIGS. 3A-3F. In one regard, and as discussed above with respect to FIGS. 3A-3F, the last section 702m may be reserved and contain a reclaim state data area 710, which functions similarly to the reclaim state data area 310.

Figure 7A:
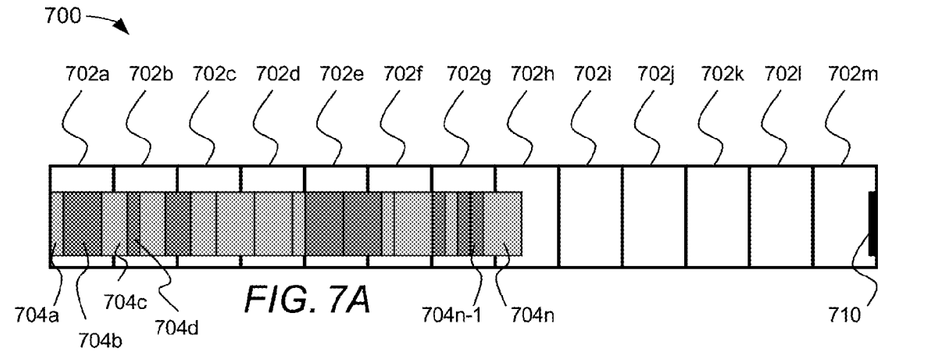
FIGS. 7A-7L, respectively, depict various stages of a reclaim operation, with interspersed expired records, according to an example of the present disclosure.
Figure 7B:
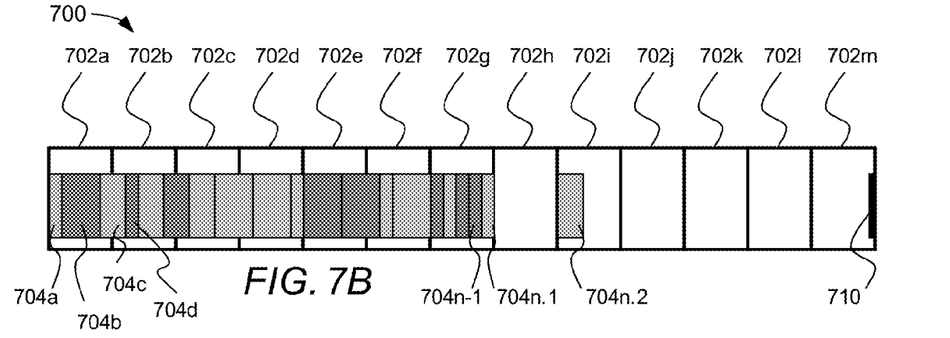

As shown in FIG. 7A, a number of expired variable records (lighter shaded blocks) are interspersed with non-expired variable records (darker shaded blocks). In addition, a reclaim operation may be initiated, for instance, as discussed above with respect to the method 500 in FIG. 5 due to a request to add a variable record larger than the amount of space available. In the example depicted in FIG. 7A, there are about four and a half sections of available space for which the next variable record may be added. As shown in FIG. 7B, a portion 704n.2 of the last variable record 704n is moved in a first direction from the section 702h to a free adjacent section 702i. In this regard, instead of moving the entire variable record 704n, only the portion contained within the section 702h is moved to the adjacent section 702i. In addition, the portion 704n.2 of the variable record 704n is depicted as occupying only a portion of the section 702i. In this scenario, transferring of sections 702i-702l to 702j-702m may have already been done or may have been skipped because it was known that no information resided in those sections. The reclaim state table 710 is updated during the operations to indicate progress and state, in various manners as discussed above.

Figure 7C:
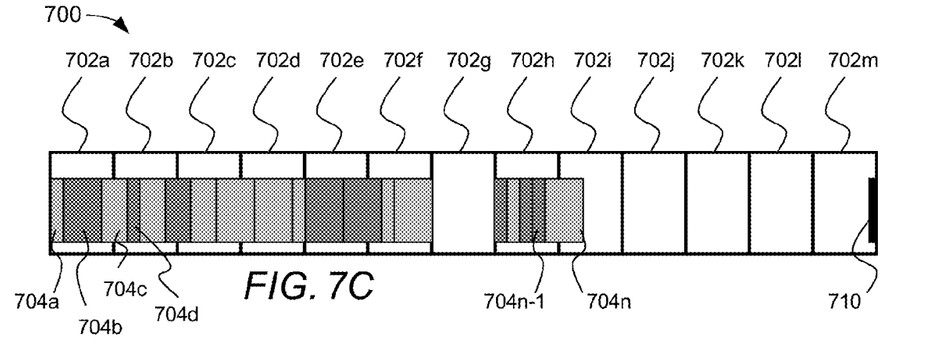
Figure 7D:
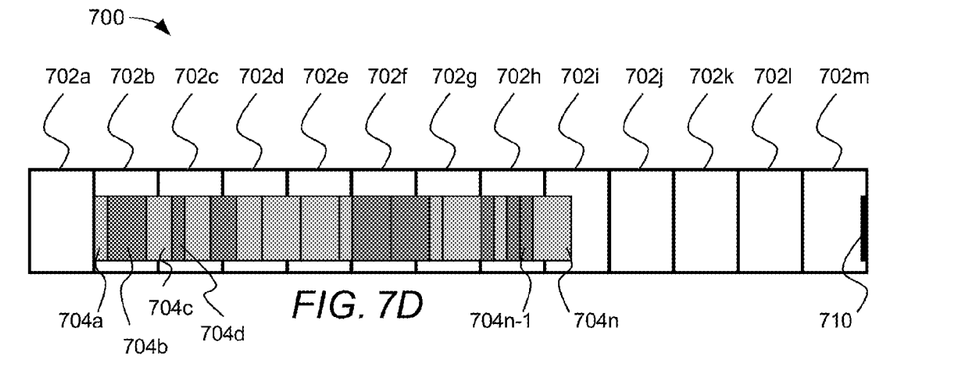

As shown in FIG. 7C, the variable records contained in section 702g, including a second portion 704n.1 of the last variable record 704n, have been moved in the first direction to section 702h. As shown in FIG. 7D, the remaining variable records have all been shifted or slid in the first direction, thereby leaving the first section 702a empty. Although not explicitly shown in FIGS. 7A-7D, each of the variable records 704a-704n, including the expired variable records, are moved in the first direction one section 702a-702h at a time while updating the reclaim state table 710. This may cause the variable records 704a-704n that span across multiple sections to be split during respective moves.

Figure 7E:
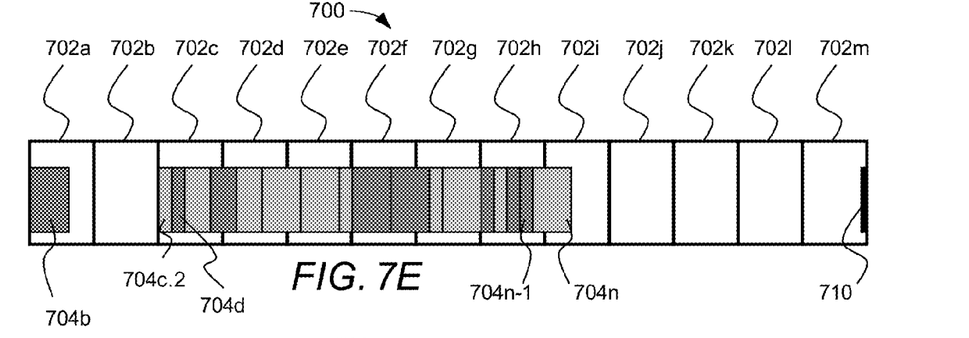

As shown in FIG. 7E, the first variable record 704a, which has been depicted as being expired, is not moved in the second direction and into the first section 702a. In this regard, the first variable record 704a has been erased and the second variable record 704b is moved into the first section 702a that was previously occupied by the first variable record 704a. In addition, the third variable record 704c has been depicted as being expired and thus, the portion 704c.1 (not shown) contained in the second section 702b is not moved with the second variable record 704b, but is erased from the second section 702b. This causes a second portion 704c.2 to remain in the third section 702c. The reclaim state table 710 is updated during the operations to indicate progress and state.

Figure 7F:
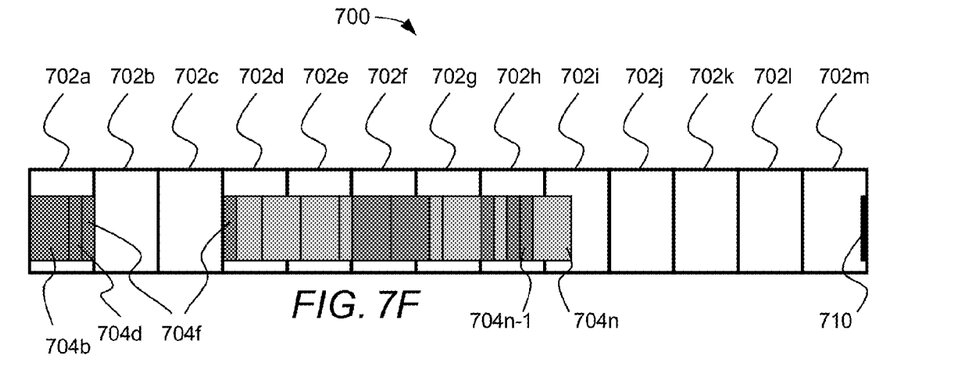

As shown in FIG. 7F, the non-expired variable records contained in the third section 702c are moved in the second direction, while the expired variable records contained in the third section 702c are erased. As noted above, the second direction is opposite the first direction and thus, the second direction is opposite a direction in which the variable records 704a-704n are read from the sections 702a-702m. More particularly, the variable record 704d and part of the variable record 704f contained in the third section 702c have been moved to the first section 702a, while the expired variable records located between them have been erased. The reclaim state table 710 is updated during the operations to indicate progress and state.

Figure 7G:
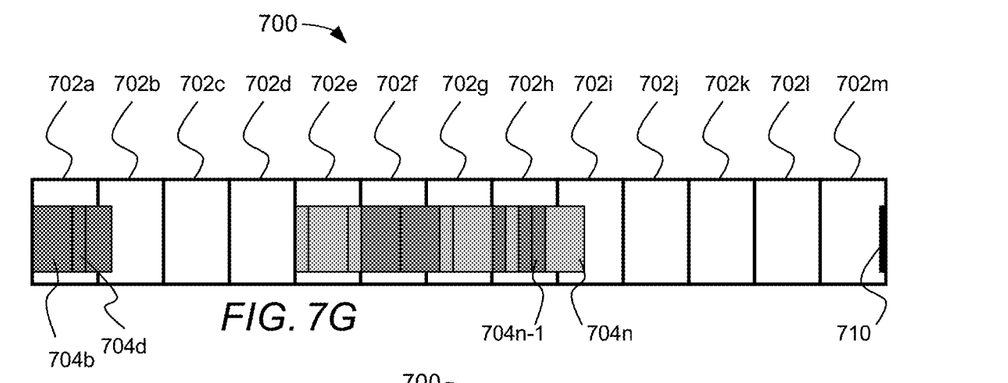
Figure 7H:
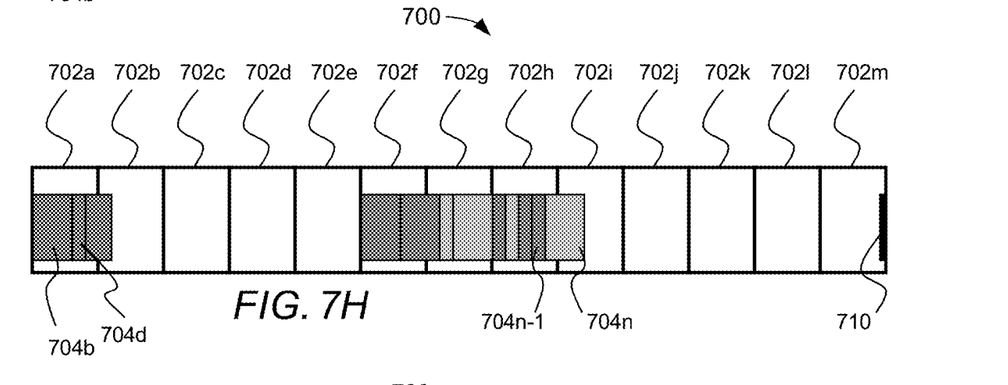
Figure 7I:
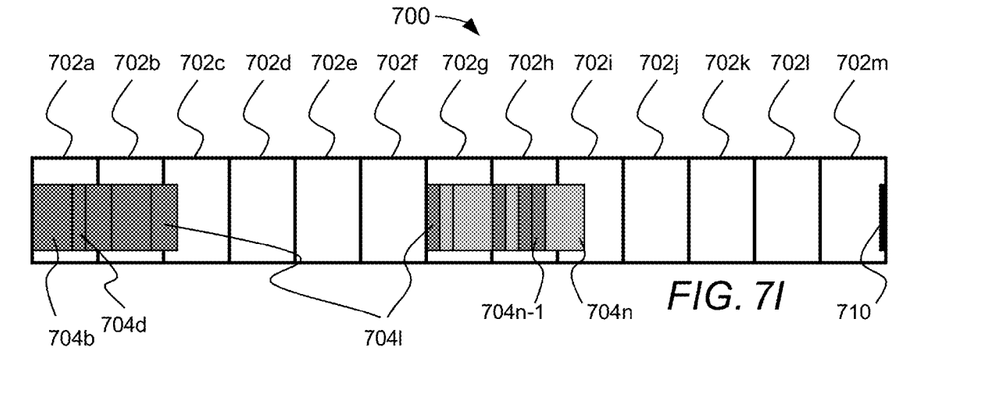
Figure 7J:
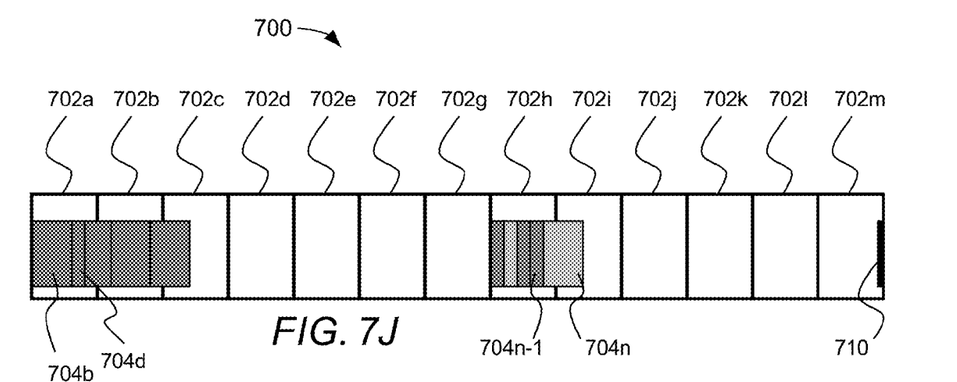
Figure 7K:
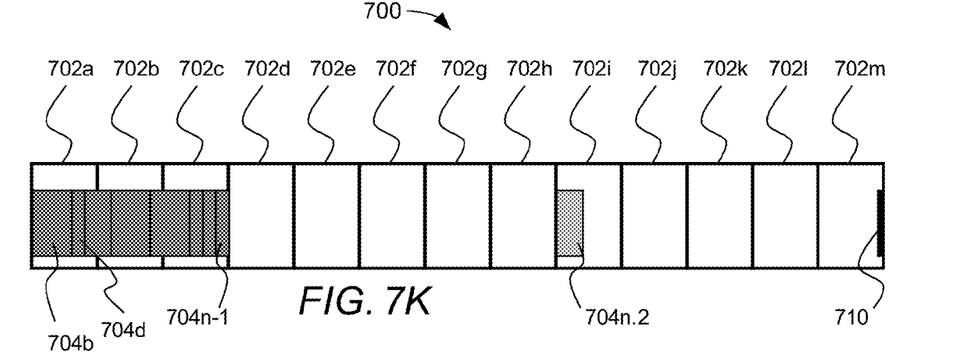
Figure 7L:
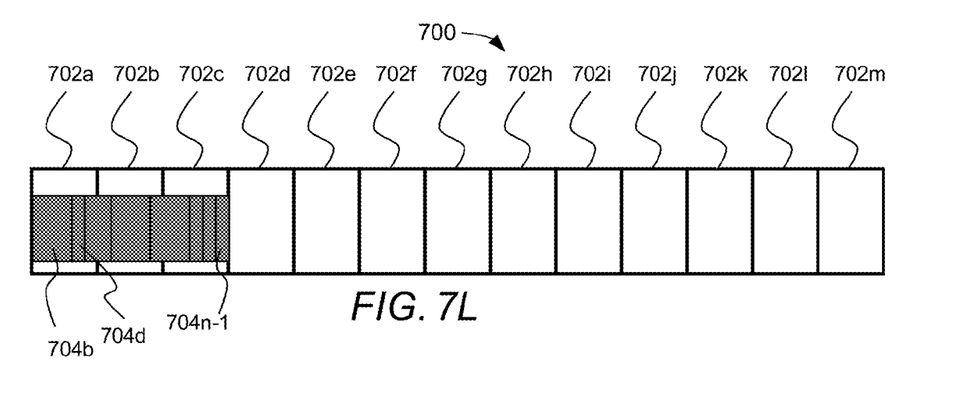

As shown in FIG. 7G, the remaining portion of the variable record 704f has been moved to the second section 702b. In addition, the expired variable records that were contained in the fourth section 702d have been erased, leaving the third and fourth sections 702c and 702d empty. As shown in FIG. 7H, the expired record variables contained in the fifth section 702e have been erased and in FIG. 7I, the record variables contained in the sixth section 702f have been moved in the second direction to occupy space in the second and third sections 702b and 702c. As shown in FIG. 7J, the non-expired variable record has been moved in the second direction to occupy space in the third section 702c and the expired variables have been erased from section 702g. As shown in FIG. 7K, the non-expired variable records in section 702h have been moved in the second direction occupy space in the third section 702c, leaving only a portion of an expired variable record 704n.2 in the section 702i. As shown in FIG. 7L, the remaining portion of the expired variable record 704n.2 has been erased and the reclaim state data area 710 has been removed, thus completing the reclaim operation. The reclaim state table 710 is updated during the operations to indicate progress and state, up to the point of the total completion of the reclaim operation.

Some or all of the operations set forth in the methods 200, 500, and 600 may be contained as a utility, program, or subprogram, in any desired non-transitory computer accessible medium. In addition, the methods 200, 500, and 600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

What has been described and illustrated herein is an example of the disclosure along with some of its variations. The terms, descriptions and figures used herein are set forth by way of illustration only and are not meant as limitations.

Many variations are possible within the spirit and scope of the disclosure, which is intended to be defined by the following claims—and their equivalents—in which all terms are meant in their broadest reasonable sense unless otherwise indicated.

What is claimed is:

1. A method for reclaiming space occupied by an expired variable record in a non-volatile record storage comprising:
   maintaining, by a processor, a reclaim state data that includes a state of a reclaim operation;
   marking the state of the reclaim operation to indicate a progress of the reclaim operation at a plurality of stages of the reclaim operation; and
   implementing the reclaim operation by,
   a) sliding, one section at a time, data in a first direction along a plurality of sections of the non-volatile record storage, wherein the data includes a plurality of variable records, the plurality of variable records including the expired variable record; and
   b) sliding, one section at a time, the variable records, excluding the expired variable record, in a second direction along the plurality of sections, to thereby remove the expired variable record.

2. The method according to claim 1, wherein a) further comprises transferring, one at a time, the data from the plurality of sections in which the data is recorded to a plurality of the sections located in a first direction along the plurality of sections, and wherein b) further comprises transferring, one at a time, the variable records, excluding the expired variable record, from the plurality of the sections to which the variable records were transferred to a plurality of the sections located in the second direction.

3. The method according to claim 2, wherein the plurality of sections comprise a reserved empty section positioned at a distal end of the plurality of sections along the first direction, and wherein transferring the data in the first direction further comprises copying the data recorded in a first section of the plurality of sections positioned closest to the reserved empty section to an adjacent section in the first direction; and
   wherein marking the state of the reclaim operation further comprises marking the state of the reclaim operation to indicate that the contents of the first section positioned closest to the reserved empty section have been transferred into the adjacent section.

4. The method according to claim 3, wherein transferring the data in the first direction further comprises:
   erasing the data from the first section positioned closest to the reserved empty section;
   marking the state of the reclaim operation to indicate that the data has been erased from the first section;
   copying the data recorded in a second section of the plurality of sections into the first section, wherein the second section is positioned adjacent to the first section in the second direction along the plurality of sections;
   marking the state of the reclaim operation to indicate that the data recorded in the second section has been copied into the first section;
   erasing the data from the second section; and
   marking the state of the reclaim operation to indicate that the data recorded in the second section has been erased.

5. The method according to claim 4, said method further comprising:
   marking the state of the reclaim operation to indicate that the transfer of the variable record in the second direction has been started prior to transferring the variable records in the second direction; and
   wherein transferring the variable records, excluding the expired variable record, further comprises:
   copying the variable record recorded in a third section to a fourth section, wherein the third section comprises a section of the plurality of sections having a variable record that is positioned furthest from the reserved empty section and the fourth section comprises a section of the plurality of sections that is positioned furthest from the reserved empty section in the second direction;
   marking the state of the reclaim operation to indicate that the variable record recorded in the third section has been copied into the fourth section;
   erasing the data from the third section; and
   marking the state of the reclaim operation to indicate that the variable record recorded in the third section has been erased.

6. The method according to claim 1, wherein the variable records are stored in a layout that enables the variable records to be readable by code prior to utilization of random access memory (RAM) being available and to be readable during implementation of the reclaim operation.

7. The method according to claim 1, wherein a variable record spans across multiple ones of the plurality of sections, and wherein transferring the variable record, excluding the expired variable data, further comprises:
   sequentially transferring portions of the variable record contained in each of the multiple ones of the plurality of sections; and
   marking the state of the reclaim operation to indicate that portions of the variable record contained in the multiple ones of the plurality of sections have been sequentially transferred between each transfer of the portions of the variable record.

8. The method according to claim 1, further comprising:
   determining whether an incoming variable record contains a predetermined type of information,
   generating a master variable header for each of the variable records that identifies which of the various types of information the respective variable record contains;
   omitting headers pertaining to the types of information that are not contained in the respective variable records from the respective variable record to substantially minimize sizes of the variable records;
   reformatting input data that is determined to contain the predetermined type of information; and
   concatenating remaining headers and the input data into a single variable record.

9. The method according to claim 8, wherein generating the master variable header for each of the variable records further comprises generating the master variable header for each of the variable records to include a listing of optional headers pertaining to the types of information and an indication of whether the types of information of the optional headers are contained in the variable records.

10. A computing apparatus comprising:
    a non-volatile record storage having a plurality of sections upon which data is recorded, wherein the data includes a plurality of variable records, the plurality of variable records including an expired variable record;
    a module to maintain a reclaim state data area that includes a state of a reclaim operation, to mark the state of the reclaim operation to indicate a progress of the reclaim operation at a plurality of stages of the reclaim operation, to implement the reclaim operation by transferring, one section at a time, the data from the plurality of sections in which the data is recorded to a plurality of the sections located in a first direction along the plurality of sections, and by transferring, one section at a time, the variable records, excluding the expired variable record, from the plurality of the sections to which the variable records were transferred to a plurality of the sections located in a section direction, to thereby remove the expired variable record; and a processor to implement the module.

11. The computing apparatus according to claim 10, wherein a variable record spans across multiple ones of the plurality of sections, and wherein the module is further to implement the reclaim operation by sequentially transferring portions of the variable record contained in each of the multiple ones of the plurality of sections and to mark the state of the reclaim operation to indicate that portions of the variable record contained in the multiple ones of the plurality of sections have been sequentially transferred between each transfer of the portions of the variable record.

12. The computing apparatus according to claim 10, wherein the processor is to implement the module to implement the reclaim operation in response to a determination that sufficient space is unavailable for a variable record addition or update in the non-volatile record storage.

13. The computing apparatus according to claim 10, wherein the non-volatile record storage is to be implemented by at least one of a basic input and output system (BIOS) firmware and a unified extensible firmware interface BIOS (UEFI) firmware to store the variable records.

14. A non-transitory computer readable storage medium including instructions that if executed cause a processor to:

maintain a reclaim state data area that includes a state of a reclaim operation;

mark the state of the reclaim operation to indicate a progress of the reclaim operation at a plurality of stages of the reclaim operation;

implement the reclaim operation by,
 a) sliding, one section at a time, data in a first direction along a plurality of sections of the non-volatile record storage, wherein the data includes a plurality of variable records, the plurality of variable records including the expired variable record; and
 b) sliding, one section at a time, the variable records, excluding the expired variable record, in a second direction along the plurality of sections, to thereby remove the expired variable record.

15. The non-transitory computer readable storage medium according to claim 14, said computer program further comprising computer readable code to:

determine whether an incoming variable record contains a predetermined type of information, generate a master variable header for each of the variable records that identifies which of the various types of information the respective variable record contains;

omit headers pertaining to the types of information that are not contained in the respective variable records from the respective variable record to substantially minimize sizes of the variable records;

reformat input data that is determined to contain the predetermined type of information; and concatenate remaining headers and the input data into a single variable record.

\* \* \* \* \*